Patented July 26, 1949

2,477,537

UNITED STATES PATENT OFFICE 2,477,537

PARA-NITROBENZYL ETHERS OF TYROSINE AND CERTAIN DERIVATIVES

Souren Avakian, Oreland, and Gustav J. Martin, Philadelphia, Pa., assignors to The National Drug Company, Philadelphia, Pa., a corporation of Pennsylvania No Drawing. Application May 14, 1948,
Serial No. 27,146

5 Claims. (Cl. 260—519)

Our invention relates to new chemotherapeutic agents. More particularly, it is concerned with the para-nitrobenzyl ethers of tyrosine and of N-acetyltyrosine as well as the salts of these ethers.

We have discovered that these novel ethers and their salts are very effective displacing agents for thyroxine, the active hormone of the thyroid gland. Accordingly, they are valuable chemotherapeutic agents in the treatment of hyperthyroidism. Hyperthyroids are generally treated with compounds such as thiouracil or propyl thiouracil. However, these agents are relatively toxic and must be used with great care. Our new agents have the advantage that they are not nearly so toxic, and that their action is to displace the thyroxine liberated in the patient's body, thereby reducing the undesired effects of excessive quantities thereof without introducing other undesirable ill effects.

Our new chemotherapeutic agents may be administered orally, intramuscularly or intravenously. The dosage is dependent upon the degree of hyperthyroidism possessed by the patient and will, therefore, vary widely. When taken orally, the dosages may range from 10 to 400 milligrams daily.

The para-nitrobenzyl ether of N-acetyltyrosine may be prepared by condensing N-acetyltyrosine with a para-nitrobenzyl halide, such as the chloride or bromide. This ether is readily soluble in ethyl alcohol and sparingly soluble in water. It forms salts by neutralization of the carboxylic acid group, upon the addition of alkaline materials. Among these salts are the alkali metal, the alkaline earth metal, the ammonium, magnesium, etc. salts. The preferred salts are the sodium and potassium salts, which are white, crystalline materials, soluble in water and in dilute ethyl alcohol.

The para-nitrobenzyl ether of tyrosine may be prepared simply by hydrolyzing the corresponding N-acetyl compound to remove the acetyl group. It is soluble in ethyl alcohol and to a limited extent in water. It likewise forms salts with alkaline materials by neutralization of the carboxylic acid group. In addition, it forms salts with acids, particularly mineral acids, owing to the presence of a free amino group. Both the alkaline and the acid salts are soluble in water.

The following examples will serve to illustrate how one may conveniently prepare our novel ethers. Other methods will probably occur to those skilled in the art, and our invention is not limited to any particular method or to the details given in these examples.

Example I

N-acetyltyrosine was prepared from tyrosine according to the directions given by Behr and Clarke in the Journal of the American Chemical Society, Volume 54 (1932), on page 1030. 11.2 grams of this N-acetyltyrosine were dissolved in 100 cc. of a 1 N aqueous sodium hydroxide solution. To this solution there were added 11 grams of para-nitrobenzyl bromide, while stirring. The temperature was raised to 70–75° C. and held there for 10 minutes. At the end of this period the reaction mixture was heated to 85–90° C. for an additional 5 minutes.

The reaction mixture was thereafter allowed to cool down to room temperature and was then filtered. The filtrate was extracted with ether, and the aqueous portion acidified by the addition of hydrochloric acid. Upon acidification, a precipitate formed, which was filtered out and then recrystallized by cooling a solution thereof in hot, dilute ethyl alcohol. This gave 14.5 grams (81% yield) of a white crystalline material that melted at 146–147° C. and which was the desired para-nitrobenzyl ether of N-acetyltyrosine.

Example II

One gram of the para-nitrobenzyl ether of N-acetyltyrosine, obtained as described in the foregoing example, was hydrolyzed by refluxing it in a 1:1 mixture of ethyl alcohol and hydrochloric acid for two hours. The solvent was thereafter evaporated to dryness under reduced pressure, the residue was dissolved in water, and the aqueous solution was then neutralized with ammonium hydroxide. A precipitate formed which was filtered out and recrystallized from ethyl alcohol to give a pure product melting at 209–211° C. This was the para-nitrobenzyl ether of tyrosine.

We claim:

1. A compound selected from the group consisting of the para-nitrobenzyl ethers of tyrosine and of N-acetyltyrosine, and the alkali metal, alkaline earth metal and ammonium salts of these ethers.
2. The para-nitrobenzyl ether of tyrosine.
3. The para-nitrobenzyl ether of N-acetyltyrosine.
4. The alkali metal salts of the para-nitrobenzyl ethers of tyrosine and of N-acetyltyrosine.
5. The hydrochloride of the para-nitrobenzyl ether of tyrosine.

SOUREN AVAKIAN.
GUSTAV J. MARTIN.

REFERENCES CITED

The following references are of record in the file of this patent:

Sanger: Brochem. J., vol. 39, pp. 507–515 (1945). (Copy in Science Library).